Nov. 8, 1932.　　　J. D. McEWEN　　　1,887,377
CLUTCH
Filed Aug. 22, 1931　　　2 Sheets-Sheet 1

INVENTOR.
JOHN D McEWEN
BY
ATTORNEYS.

Nov. 8, 1932.   J. D. McEWEN   1,887,377
CLUTCH
Filed Aug. 22, 1931   2 Sheets-Sheet 2

INVENTOR.
JOHN D. McEWEN
BY
ATTORNEYS.

Patented Nov. 8, 1932

1,887,377

UNITED STATES PATENT OFFICE

JOHN D. McEWEN, OF TORRANCE, CALIFORNIA, ASSIGNOR TO INTERNATIONAL-STACEY CORPORATION, OF COLUMBUS, OHIO, A CORPORATION OF OHIO

CLUTCH

Application filed August 22, 1931. Serial No. 558,771.

My invention relates to clutches. It has to do particularly with clutches adapted for use in connection with counter-shafts such as are commonly used in driving oil wells or other equipment, although it is not necessarily limited thereto.

In the use of clutches in the type of service indicated, it is frequently desirable to utilize the clutch both as a clutch and as a braking means. This calls for more or less frequent slippage of the clutch, as for instance during hoisting operation. This slippage generates a large amount of heat which is ordinarily absorbed by the clutch drum, due to the fact that the friction linings as ordinarily used are poor heat conductors. In an internal expanding clutch, this has given rise to the difficulty that the expansion of the drum reduces the pressure between the bands and the drum to such an extent that the clutch will not transmit the desired horsepower without adjustment. Such an adjustment during the progress of operations is undesirable and impracticable. Furthermore, if such a manual adjustment is effected during operation, workmen commonly fail to alter this adjustment after completion of the operation. The clutch drum then cools off, and the consequent contraction creates excessive pressure which brings about breakage of certain of the operative parts.

One of the objects of this invention is to eliminate the drawbacks which arise because of these varying temperature conditions and to provide a means for effectively meeting the conditions outlined while at the same time obviating the dangers of breakage.

Another object of this invention is to provide a simple and effective apparatus whereby the necessity for adjustment during operation will be eliminated while the necessity for adjustment at any time will be reduced to a minimum.

Another object of my invention is to provide a clutch which will be effective either as a clutch or a brake in either direction of rotation but which will be so constructed that mere rotation of the driving element of the clutch cannot accidentally cause it to operate either as a clutch or brake.

In its preferred embodiment, my invention takes the form of an internal expanding band clutch. It comprises a drum rotatably mounted upon a shaft with an expanding band unit keyed to the shaft and having the band thereof expansible against an inner periphery of this drum. The band is preferably comprised of two sections which are pivotally mounted upon the same pin. At one end, these sections are spaced apart and expansible by a toggle lever mechanism. At the other end, they extend beyond the pivot pin upon which they are mounted and are provided with counter-weights which act centrifugally during idle rotation of the clutch to facilitate disengagement and to prevent dragging and accidental braking or clutching action of the band.

The preferred embodiment of my invention is shown in the accompanying drawings wherein similar characters of reference designate corresponding parts and wherein Figure 1 is a perspective view partially broken away of the expanding unit of my clutch.

Figure 1:
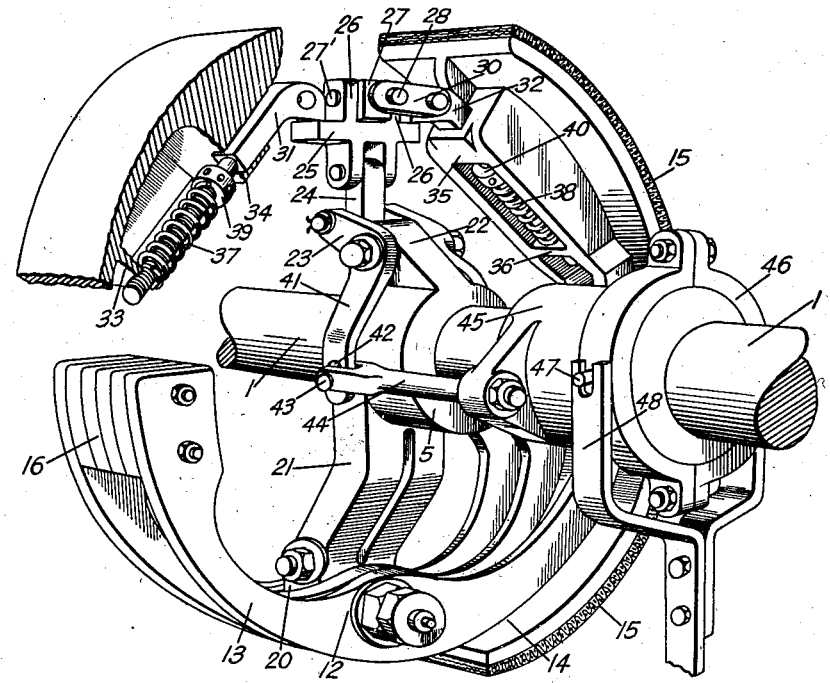

In the drawings, there is shown a shaft 1 upon which is rotatably mounted a pulley structure 2 through the medium of a roller bearing structure 3. The roller bearing structure 3 is keyed upon the shaft 1.

Figure 5:
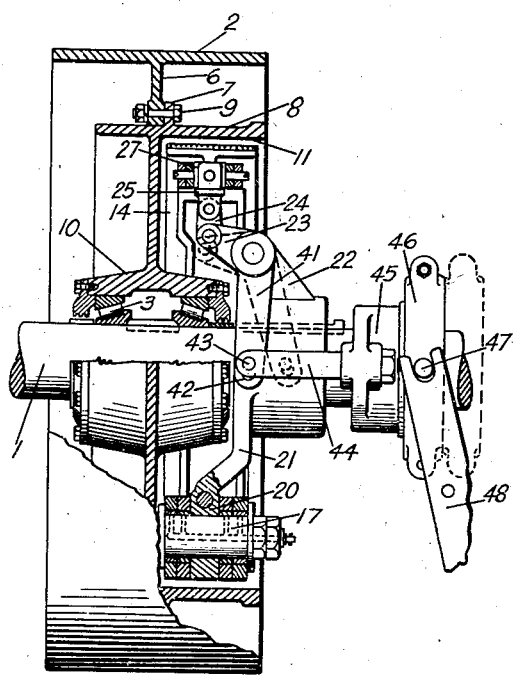
Figure 5 is a side elevation, partially in section, of the structure shown in Figure 3.

As shown in Figure 5, this pulley structure 2 comprises an inwardly extending annular flange 6 which is preferably centrally disposed and which is bolted at its inner periphery to an annular flange 7 upon the outer periphery of a drum 8 by means of bolts 9. This drum 8 has an integral web and a hub 10 which co-operates with the roller bearing structure in a manner which will be readily understood.

On one side of the web, the drum 8 carries an internal friction surface 11. This friction surface 11 is of sufficient width to house expanding shoes which are mounted therein as will be described, and which are designed to operate either as braking or clutching elements.

As illustrated in Figure 1, each band section comprises an enlarged portion 12 with arms 13 extending in one direction and clutch shoe 14 in the opposite direction from said enlarged portion. Each shoe 14 carries a brake lining 15 upon its outer periphery and these brake linings normally lie in proximate relation to the inner periphery 11 of the drum 8. The short arms 13 of the band section are preferably provided at their outer extremity with weight elements 16.

Figure 2:
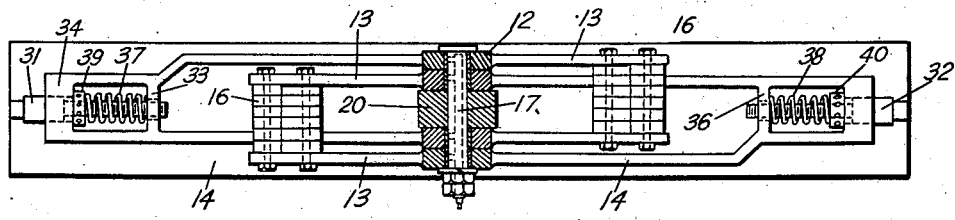
Figure 2 is a layout, partially broken away, of the structure shown in Figure 1.

The band sections, as shown in Figure 2, are mounted in interfitting relation upon a single pivot pin 17 and are further held against lateral play with relation to each other by means of enlarged portions 12.

The pin 17 which carries the band sections is in turn supported in a collar 20 which forms an integral part of an arm 21 which is likewise integrally connected to the collar 5 keyed upon the shaft 1. This collar 5 also has, diametrically opposite to the arm 21, an apertured lug 22 upon which is fulcrumed a bifurcated bell-crank lever having a short arm and a long arm.

The short arm of the bifurcated bell-crank lever is designated 23 and is pivotally connected to a radially extending link 24. The outer end of this radially extending link 24 is in turn pivoted to a thrust member 25 having spaced lugs 26 which are pivotally connected to cross head 27 with pin 27'. Crosshead 27 is provided with trunnions 28 for toggle joint members which comprise links 29 and 30.

These links 29 and 30 of the toggle members are pivotally connected at their outer ends to thrust members 31 and 32 which each extend through a pair of perforated lugs of a housing integrally formed upon the inner periphery of each shoe. The pair of perforated lugs which receives the thrust member 31 are designated 33 and 34 and the pair of perforated lugs which receives the thrust member 32 are designated 35 and 36.

Disposed upon each of the members 31 and 32, in between the said pairs of lugs are compression springs 37 and 38. The spring 37 bears at its outer end upon the lug 33 and the spring 38 bears at its outer end upon the lug 36. Each of the thrust members 31 and 32 carries a nut, respectively designated 39 and 40. These nuts may be threaded upon the thrust members and bear against the inner ends of the springs 37 and 38. The structure is such that the forcing of the joint of the toggle towards the periphery of the drum results in the exertion of a compressive action upon the springs 37 and 38 which in turn bear against the lugs 33 and 36 of the shoes and resiliently force the shoes against the inner periphery of the drum.

The long arm of the bifurcated drum lever is designated 41 and is provided with eccentric slots 42. Within these slots 42 are designed to operate pins 43 carried by arms 44 which are in turn connected to a collar 45 which is likewise mounted upon the shaft 1. A shifting collar 46 embraces the collar 45 and this collar 46 carries pins 47 which are embraced by bifurcated ends of an operating lever 48.

Figure 3:
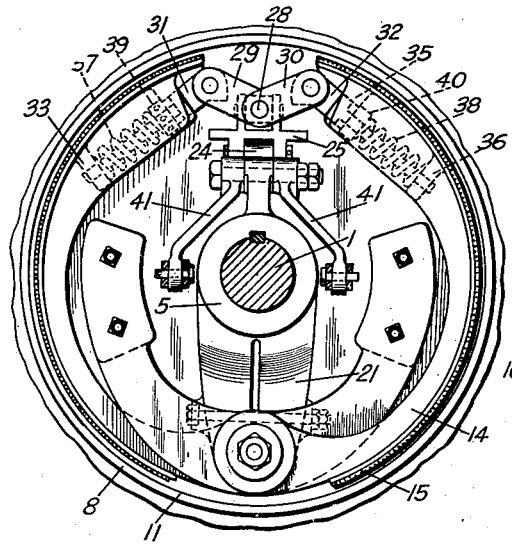
Figure 3 is a side elevation of a pulley structure, partially broken away, with my clutch forming a part thereof and showing the clutch with its expanding band contracted.
Figure 4:
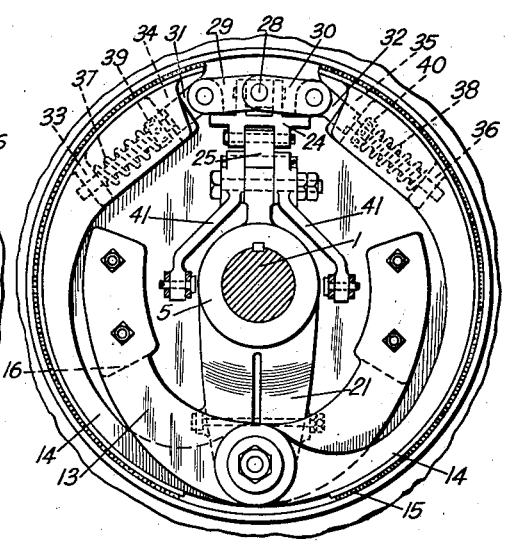
Figure 4 is a view similar to Figure 3 but showing the expanding band expanded into operative position.

The operation of this structure will be readily understood by reference to Figures 3, 4 and 5. Shifting of the collar 46 to the left of Figure 5 will serve to move the toggle lever towards the inner periphery 11 of the drum 8. The dimensions are such that the movement of these parts in this direction will ultimately move the toggle lever past dead center position, in which position the band sections are held in gripping relation to the inner periphery 11 of the drum 8 by the resilient members 37 and 38. The movement of the collar 46 towards the right of Figure 5 will bring about the immediate release of this pressing action. Should the clutch be slipped during the hoisting operation, so that enough heat is generated to cause the expansion of the drum, the coil springs 37 and 38, being under compression, will cause the band section to follow the drum as it expands. Thus, no manual adjustment is necessary to compensate for these changes in temperature and the apparatus automatically readjusts itself as the temperatures return to normal. It will be apparent that the resilient elements 37 and 38 may be located at other parts of the apparatus without departing from the spirit of my invention, it being possible to obtain this resilient operation, at least to some extent, by the provision of springs in other places than where shown.

Figure 6:
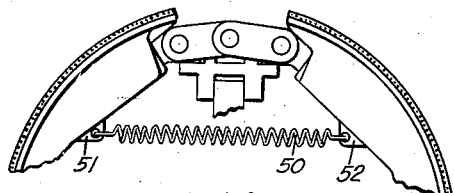
Figure 6 is a detailed view showing a slight modification of my clutch structure.

In Figure 6, I have shown a modified apparatus which particularly embodies a means for preventing dragging of the shoes upon the friction surfaces with which they are designed to cooperate. This means takes the form of a coil spring 50 which is connected to lugs 51 and 52 on the inner surfaces of the shoes of the band section and which is normally tensioned so that it tends to draw these shoes away from operative position.

Figure 7:
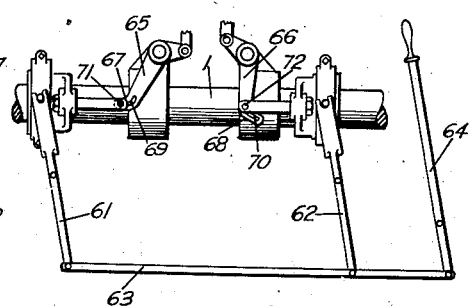
Figure 7 is a side elevation showing a plurality of clutches made in accordance with my invention and slightly modified for use in driving a single shaft in opposite direction.

In Figure 7, I have shown a modification of the clutch operating levers which especially adapts my clutches for use under conditions where it is desirable to mount more than one clutch upon a single shaft for alternately driving the shaft in opposite directions. In this structure, two operating levers 61 and 62 are actuated by a single link 63 which is in turn operated by a hand lever 64. The long arms 65 and 66 of the clutch operating levers are provided with bent portions 67 and 68 having slots 69 and 70. The arrangement of these levers and slots is such that the pins 71 and 72 which operate therein to actuate these levers and to therefore actuate the clutches may be alternately rendered effective upon one clutch without operating the other. In other words, when the link 63 is moved in one direction, one clutch will be operated to effect driving action while the other clutch will not be operated, owing to the freedom of movement of the pin and slot connection of this clutch.

More explicitly, the movement of the pin 72 to the right of Figure 7 will first actuate the lever 66 to withdraw the brake-shoes from operative position. While this is occurring, the pin 71 is also moving to the right but the angle at which the slot 69 lies is such that the clutch lever 65 is not actuated. However, continued movement of the pin 72 to the right along slot 70 is accompanied by actuation of the lever 65 by the pin 71.

It will thus be seen that I have provided a clutch structure wherein the shoes of the clutch are held in operative position for either clutching or braking by means of coil springs which automatically compensate for any variation of dimensions due to changing temperature conditions. It will furthermore be apparent that these coil springs eliminate all possibility of shearing of the toggle pins or breakage of the parts.

It will likewise be apparent that by the use of my counterweights or by the use of the tension spring 50, easy disengagement of the clutch will be assured. Likewise, all danger of dragging of the clutch shoes when the two clutches are used upon one shaft will be obviated.

Many other advantages of my invention will appear from the description and from the claim, although it might be well to mention that the provision of two shoes mounted upon a single pin greatly simplifies the clutch mechanism.

Having thus described my invention, what I claim is:

Clutch structure comprising a drum, a pair of pivotally mounted shoes, counterweights connected to said shoes, toggle lever mechanism for operating said shoes, and resilient means for transmitting pressure from said toggle lever mechanism to said shoes.

In testimony whereof, I hereby affix my signature.

JOHN D. McEWEN.